United States Patent
Akamatsu et al.

(10) Patent No.: US 8,262,291 B2
(45) Date of Patent: Sep. 11, 2012

(54) CORELESS SEAL AND ROLLING BEARING

(75) Inventors: Hideki Akamatsu, Iwata (JP); Kenji Nakagawa, Okayama (JP)

(73) Assignees: NTN Corporation, Osaka (JP); Uchiyama Manufacturing Corp., Okayama (JP)

(*) Notice: Subject to any disclaimer, the term of this patent is extended or adjusted under 35 U.S.C. 154(b) by 721 days.

(21) Appl. No.: 11/991,408

(22) PCT Filed: Aug. 31, 2006

(86) PCT No.: PCT/JP2006/317235
§ 371 (c)(1),
(2), (4) Date: Mar. 4, 2008

(87) PCT Pub. No.: WO2007/029596
PCT Pub. Date: Mar. 15, 2007

(65) Prior Publication Data
US 2009/0154854 A1 Jun. 18, 2009

(30) Foreign Application Priority Data

Sep. 7, 2005 (JP) ................................. 2005-259273
Sep. 7, 2005 (JP) ................................. 2005-259274

(51) Int. Cl.
*F16C 33/76* (2006.01)
*F16J 15/34* (2006.01)

(52) U.S. Cl. ....................................... 384/484; 277/353

(58) Field of Classification Search .................. 384/477, 384/481, 482, 484–487, 489, 601; 277/353, 277/371, 395, 402, 549, 551, 553, 559, 565, 277/567, 572
See application file for complete search history.

(56) References Cited

U.S. PATENT DOCUMENTS

| 3,957,278 | A | * | 5/1976 | Rabe | 277/549 |
| 5,419,641 | A | * | 5/1995 | Fujinami et al. | 384/484 |
| 5,431,415 | A | * | 7/1995 | Millonig et al. | 277/353 |
| 5,678,829 | A | * | 10/1997 | Kalsi et al. | 277/559 |
| 6,189,894 | B1 | * | 2/2001 | Wheeler | 277/549 |
| 7,758,251 | B2 | * | 7/2010 | Akamatsu | 384/564 |

FOREIGN PATENT DOCUMENTS

| JP | 61-256066 | 11/1986 |
| JP | 2000-088109 | 3/2000 |
| JP | 2004-293618 | 10/2004 |

OTHER PUBLICATIONS

English translation of JP2000088109, translation obtained on Jan. 20, 2011.*

* cited by examiner

*Primary Examiner* — James Pilkington
(74) *Attorney, Agent, or Firm* — Clark & Brody (57) ABSTRACT

A coreless seal arranged between a rotation shaft and an outer member has an inner diameter surface opposed to an outer diameter surface of the rotation shaft with a space for preventing leakage of fluid. The outer member has a flange bent inwardly. The coreless seal has an outer diameter and an inner diameter that are dimensions obtained by adding interference for an amount of thermal shrinkage as a whole dimension.

4 Claims, 6 Drawing Sheets

CORELESS SEAL AND ROLLING BEARING

TECHNICAL FIELD

The present invention relates to a coreless seal and a rolling bearing and more particularly, to a coreless seal and a rolling bearing used at low temperature.

BACKGROUND ART

Figure 6:
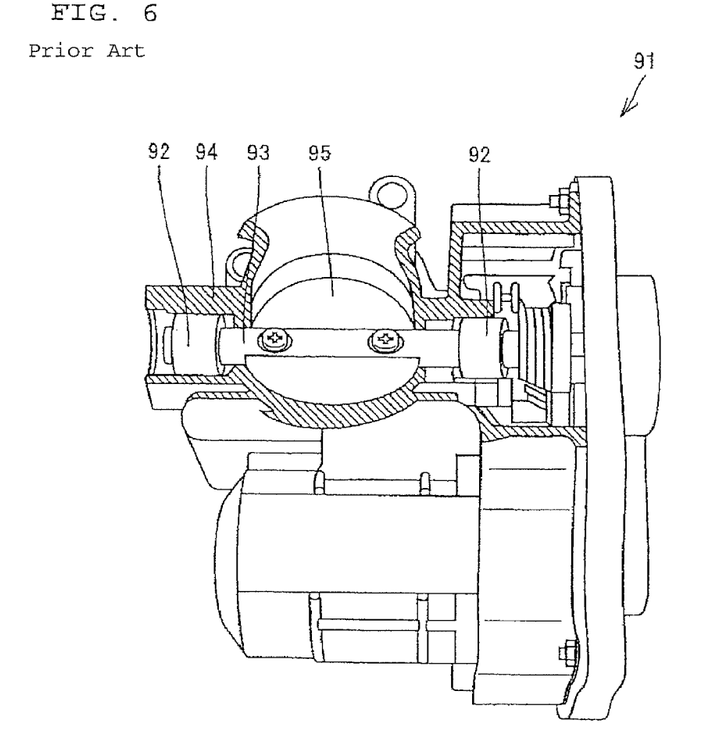
FIG. 6 is a schematic view showing a throttle valve device.

A device to control air inflow to an engine of a car and the like includes a throttle valve device. FIG. 6 is a schematic view showing one example of the throttle valve device. Referring to FIG. 6, a throttle valve device 91 comprises a throttle body 94 forming an air inlet path in its inside, a throttle blade 95 adjusting an air inlet amount by opening and closing, a throttle shaft 93 to fix the throttle blade 95, and a shell-type roller bearing 92 to support the throttle shaft 93 rotatably. Here, the shell-type roller bearing 92 is used as a bearing to support the throttle shaft 93 because an outer diameter of the bearing is smaller than that of a ball bearing and the like, and a seal having high sealing properties can be assembled in, so that it has air leak protection performance.

The throttle valve device 91 opens and closes the throttle blade 95 by rotating the throttle shaft 93 by a wire or a motor (not shown) through a gear to adjust the air inlet amount. The shell-type roller bearing 92 is pressed into an inner diameter hole provided in the throttle body 94 and fixed.

Here, the above shell-type roller bearing for supporting the throttle shaft comprises a seal to prevent leakage of air between the bearing and the throttle shaft.

Figure 7:
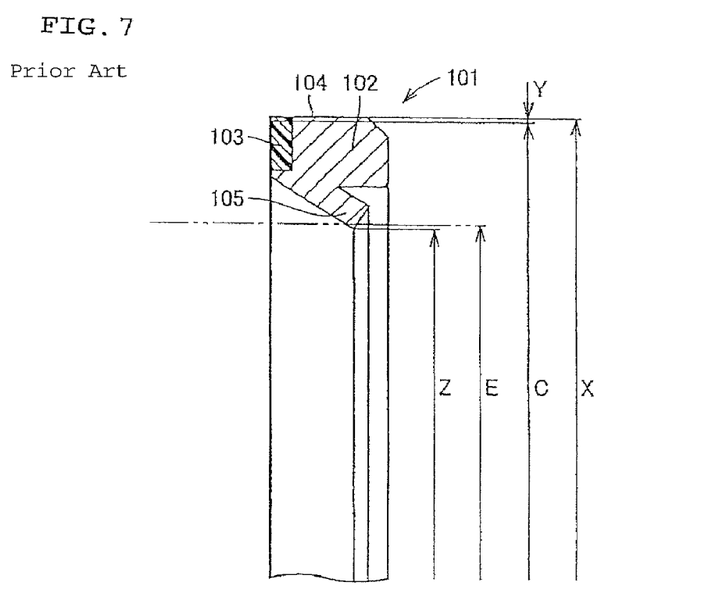
FIG. 7 is a sectional view showing a part of a conventional cored seal for being assembled in a shell-type roller bearing.

FIG. 7 is a sectional view showing a part of a conventional cored seal assembled in a shell-type roller bearing in a free state. In FIG. 7, an outer diameter surface of a throttle shaft (not shown) positioned on the inner diameter side of the cored seal for being assembled in the shell-type roller bearing is shown by a two-dot chain line. In addition, the term "free state" in this specification means a state in which the seal is not assembled between the throttle shaft and the shell-type roller bearing. Referring to FIG. 7, a cored seal 101 for being assembled in a shell-type roller bearing comprises an elastic annular member 102 and a cored bar 103 comprising a metal member. Since the cored seal for being assembled in the shell-type roller bearing comprises the cored bar 103, it can ensure rigidity and in addition, its thermal shrinkage is small even at low temperature.

An outer diameter X of the cored seal 101 for being assembled in the shell-type roller bearing is provided by adding interference 2Y to an inner diameter C of a shell-type outer ring to be assembled. Since the interference Y is provided, when the cored seal 101 for being assembled in the shell-type roller bearing is pressed into an inner diameter hole, its outer diameter surface 104 can be in contact with an inner diameter surface of the inner diameter hole so as to nip it with appropriate pressure, so that leakage between the cored seal 101 for being assembled in the shell-type roller bearing and the shell-type roller bearing can be prevented. In addition, the cored seal 101 for being assembled in the shell-type roller bearing comprises a lip part 105 projecting toward the inner diameter side. An inner diameter Z of the lip part 105 is designed so as to be smaller than an outer diameter E of the throttle shaft. Thus, when the cored seal is mounted on the throttle shaft, the lip part 105 nips the outer diameter surface of the throttle shaft with appropriate pressure and leakage between the cored seal 101 for being assembled in the shell-type roller bearing and the throttle shaft can be prevented.

Figure 8:
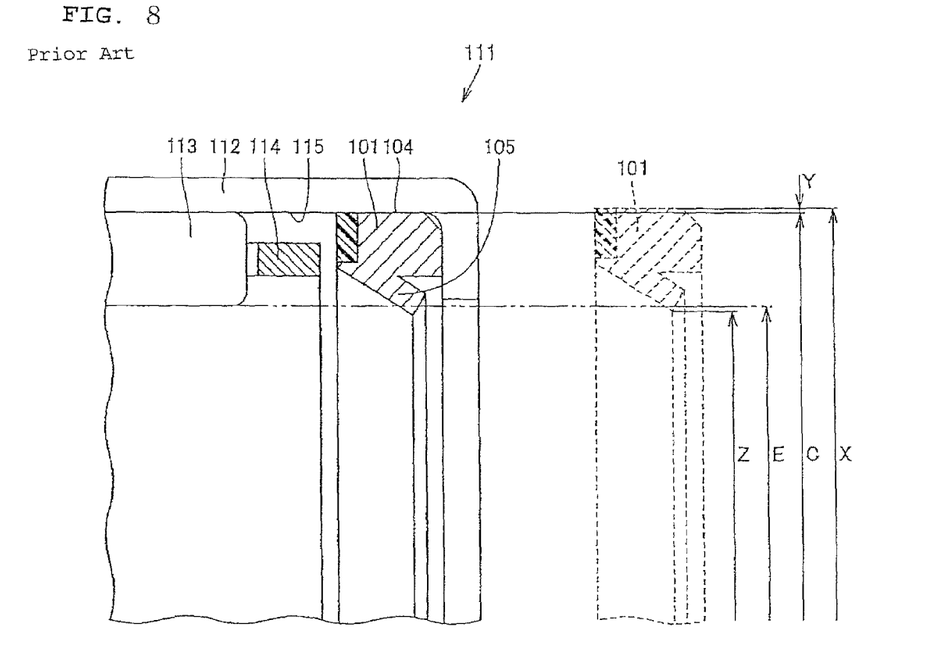
FIG. 8 is a sectional view showing a part of the conventional cored seal assembled in a shell-type roller bearing.

Next, a description will be made of a case where the cored seal 101 for being assembled in the shell-type roller bearing is assembled in a shell-type roller bearing. FIG. 8 is a sectional view showing a shell-type roller bearing 111 comprising the cored seal 101 for being assembled in the shell-type roller bearing, in which the cored seal 101 for being assembled in the shell-type roller bearing in the free state before assembled is shown by a dotted line. Referring to FIG. 8, the shell-type roller bearing 111 comprises a shell-type outer ring 112, a plurality of rollers 113, a retainer 114, and the cored seal 101 for being assembled in the shell-type roller bearing. The cored seal 101 for being assembled in the shell-type roller bearing is assembled between the shell-type outer ring 112 and a throttle shaft. Here, since an inner diameter surface 115 of the shell-type outer ring 112 nips an outer diameter surface 104 of the cored seal 101 for being assembled in the shell-type roller bearing, and an outer diameter surface of the throttle shaft nips the lip part 105 with appropriate pressure, leakage is not generated between the shell-type outer ring 112 and the throttle shaft.

However, since the cored seal 101 for being assembled in the shell-type roller bearing comprises a plurality of members, its cost becomes high. In addition, since the cored seal 101 for being assembled in the shell-type roller bearing has rigidity, it is difficult to remove it after assembled in the shell-type roller bearing.

In view of the above problem, a coreless seal assembled in a shell-type roller bearing and comprising no cored bar is disclosed in Japanese Unexamined Patent Publication No. 2004-293618. According to the Japanese Unexamined Patent Publication No. 2004-293618, since the coreless seal for being assembled in a shell-type roller bearing only comprises an elastic member, its cost is low and it can be easily removed after assembled in the shell-type roller bearing.

Figure 9:
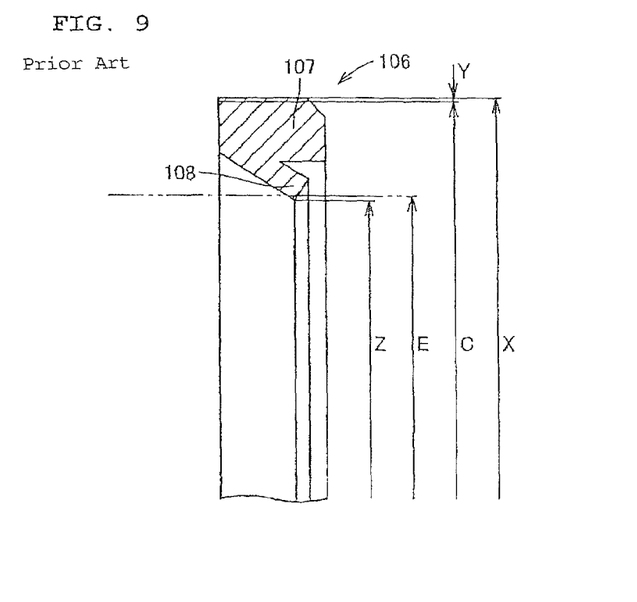
FIG. 9 is a sectional view showing a part of a conventional coreless seal for being assembled in a shell-type roller bearing.

Here, a coreless seal for being assembled in a shell-type roller bearing will be described. FIG. 9 is a sectional view showing a part of the coreless seal for being assembled in the shell-type roller bearing. Referring to FIG. 9, a coreless seal 106 for being assembled in a shell-type roller bearing comprises an elastic annular member 107 only. The dimension of the coreless seal 106 for being assembled in the shell-type roller bearing is the same as that of the cored seal 101 for being assembled in the shell-type roller bearing described above such that an outer diameter X is provided by adding the interference 2Y to an inner diameter C of an inner diameter hole, and an inner diameter Z of a lip part 108 is designed so as to be smaller than an outer diameter E of a throttle shaft.

According to the coreless seal 106 for being assembled in the shell-type roller bearing comprising only the elastic member, similar to the cored seal 101 for being assembled in the shell-type roller bearing as described above, when it is assembled between a shell-type outer ring and the throttle shaft, leakage between them can be prevented at room temperature. However, the coreless seal 106 for being assembled in the shell-type roller bearing does not have the above dimensional relation at low temperature, so that leakage between them cannot be prevented.

Figure 10:
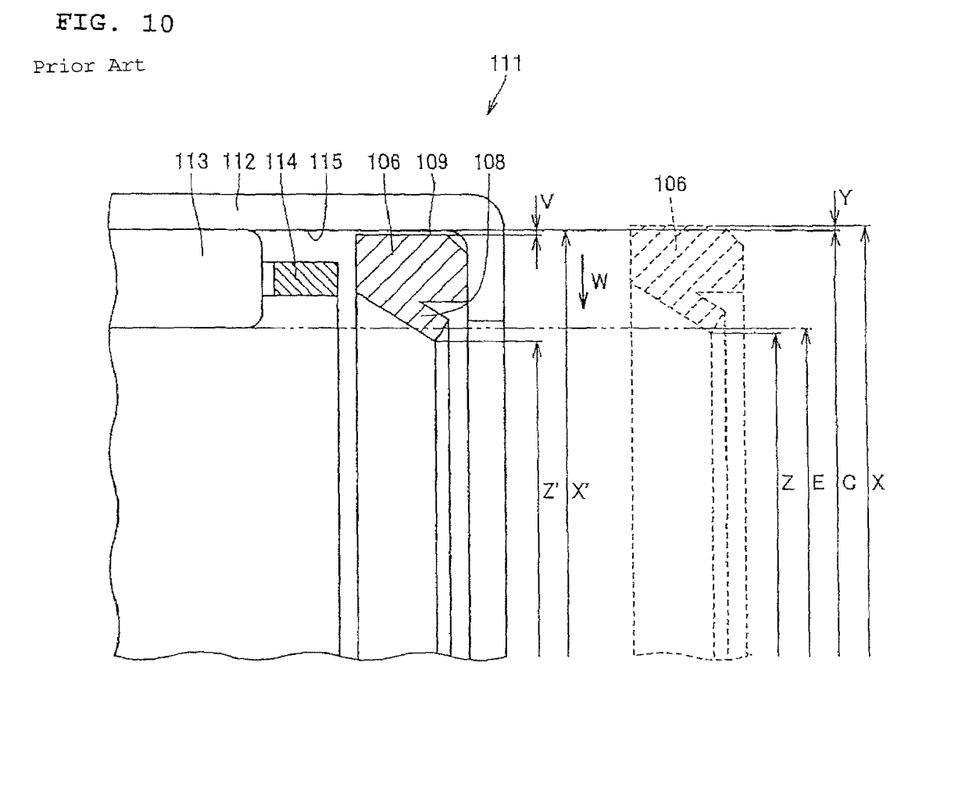
FIG. 10 is a sectional view showing a part of the conventional coreless seal assembled in the shell-type roller bearing at low temperature.

This will be described with reference to FIG. 10. FIG. 10 is a sectional view showing a part of the coreless seal 106 assembled in the shell-type roller bearing 111 at low temperature. In addition, the coreless seal 106 for being assembled in the shell-type roller bearing at room temperature is shown by a dotted line. Referring to FIG. 10, since the coreless seal 106 for being assembled in the shell-type roller bearing shrinks in a direction shown by an arrow W at low temperature, its outer diameter becomes X' from X, so that it becomes smaller than the inner diameter C of the inner diameter surface 115 of the shell-type outer ring 112. In this case, when it is assembled in the shell-type roller bearing 111, the inner diameter surface 115 of the shell-type outer ring 112 does not nip the outer diameter surface 109 of the coreless seal 106 for being assembled in the shell-type roller bearing, so that a gap V is generated between them. Thus, leakage is generated between the shell-type roller bearing 111 and the throttle shaft through the gap V.

In addition, since the lip part 108 on the inner diameter side also shrinks in the direction shown by the arrow W, the inner diameter of the lip part 108 becomes Z' from Z, so that the lip part 108 is positioned on the more inner diameter side. In this case, a nip amount is increased and a bite amount to the throttle shaft is increased, so that the throttle shaft and the coreless seal 106 for being assembled in the shell-type roller bearing are rotated together at the time of rotation, causing sealing properties to be lowered.

DISCLOSURE OF THE INVENTION

It is an object of the present invention to provide a coreless seal and a rolling bearing having high sealing properties even at low temperature.

A coreless seal according to the present invention is arranged between a rotation shaft and an outer member having an inner diameter surface opposed to an outer diameter surface of the rotation shaft with a space to prevent leakage of fluid. Here, an outer diameter of the coreless seal is a dimension obtained by adding interference for an amount of thermal shrinkage.

According to the above constitution, even when the coreless seal positioned in the space between the rotation shaft and the outer member thermally shrinks and its outer diameter is reduced at low temperature, the outer diameter dimension of the coreless seal is larger than the inner diameter dimension of the inner diameter surface of the outer member, no gap is generated between the outer diameter surface of the coreless seal and the inner diameter surface of the outer member. Therefore, even at low temperature, the outer diameter surface of the coreless seal nip the inner diameter surface of the outer member with appropriate pressure, so that high sealing properties are provided.

Preferably, when it is assumed that the dimension obtained by adding interference for an amount of thermal shrinkage in a radial direction is A, and an outer diameter dimension of the coreless seal in a free state at room temperature is B, a relation of $0.005B \leq A \leq 0.030B$ is to be satisfied. When A is not less than 0.005B, minimum interference based on the thermal shrinkage at low temperature can be ensured. In addition, when A is not more than 0.030B, since the dimension of the interference is not overly provided beyond necessity, assembling into the outer member can be easy.

More preferably, when it is assumed that an inner diameter dimension of the outer member is C, a relation of $0.950B \leq C \leq 0.985B$ is to be satisfied. Thus, an optimal dimension can be provided in a dimensional relation with the outer member for which it is not necessary to consider the thermal shrinkage.

Further preferably, when it is assumed that an inner diameter dimension of the coreless seal in a free state at room temperature is D, and an outer diameter dimension of the rotation shaft is E, a relation of $E<D<E+2A$ is to be satisfied. Thus, when the coreless seal is assembled in at room temperature, the inner diameter dimension of the lip part can be smaller than the outer diameter dimension of the rotation shaft. In addition, the coreless seal can be prevented from biting the rotation shaft at low temperature.

Further preferably, the coreless seal is a coreless seal for being assembled in a shell-type roller bearing. Thus, when it is assembled in the shell-type roller bearing, the outer diameter surface of the coreless seal can nip the inner diameter surface of the shell-type outer ring with appropriate pressure even at low temperature, high sealing properties can be provided.

According to another aspect of the present invention, a rolling bearing comprises any one of coreless seals described above. Thus, the rolling bearing has high sealing properties even at low temperature.

Preferably, the rolling bearing comprises a roller bearing having a shell-type outer ring. Such roller bearing has high sealing properties even at low temperature.

According to the present invention, even when the coreless seal shrinks thermally and its outer diameter becomes small at low temperature, since the outer diameter dimension of the coreless seal is larger than the inner diameter dimension of the inner diameter surface of the outer member, a gap is not generated between the outer diameter surface of the coreless seal and the inner diameter surface of the outer member.

As a result, the outer diameter surface of the coreless seal can nip the inner diameter surface of the outer member with appropriate pressure even at low temperature, so that high sealing properties can be provided.

BEST MODE FOR CARRYING OUT THE INVENTION

Figure 2:
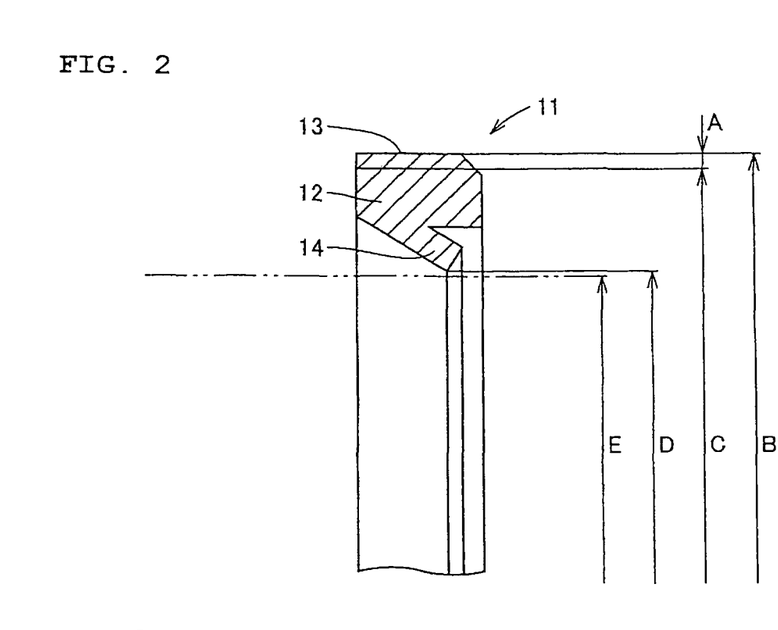
FIG. 2 is a sectional view showing a part of the coreless seal for being assembled in the shell-type roller bearing in a free state at room temperature.

An embodiment of the present invention will be described with reference to the drawings hereinafter. FIG. 2 is a sectional view showing a part of a coreless seal according to one embodiment of the present invention as a coreless seal for being assembled in a shell-type roller bearing, in a free state at room temperature. Referring to FIG. 2, a coreless seal 11 for being assembled in a shell-type roller bearing only comprises an elastic annular member 12. An outer diameter B of the coreless seal 11 for being assembled in the shell-type roller bearing is a dimension obtained by adding interference 2A for an amount of thermal shrinkage to an inner diameter C of a shell-type outer ring serving as an outer member. In addition, an inner diameter D of the coreless seal 11 for being assembled in the shell-type roller bearing in which a lip part 14 projects toward the inner diameter is designed so as to be a little larger than an outer diameter E of a rotation shaft (not shown) supported by the shell-type roller bearing.

Here, it is preferable that $0.005B \leqq A \leqq 0.030B$ is implemented in the above dimensional relation. When A is not less than 0.005B, minimum interference at low temperature can be ensured. In addition, when A is not more than 0.030B, since the dimension of the interference is not overly provided beyond necessity, assembling can be easy. In addition, the dimensional relation may be such that $0.950B \leqq C \leqq 0.985B$. Thus, the outer diameter B can be defined by the relation with the inner diameter C of the shell-type outer ring for which it is not necessary to take into consideration the thermal shrinkage. Furthermore, the dimensional relation may be such that $E<D<E+2A$. When D is larger than E, a biting amount to the rotation shaft at the time of assembling can be appropriate in view of the shrinkage at low temperature. In addition, when D is smaller than E+2A, the lip part can bite appropriately the rotation shaft at the time of assembling.

Figure 1:
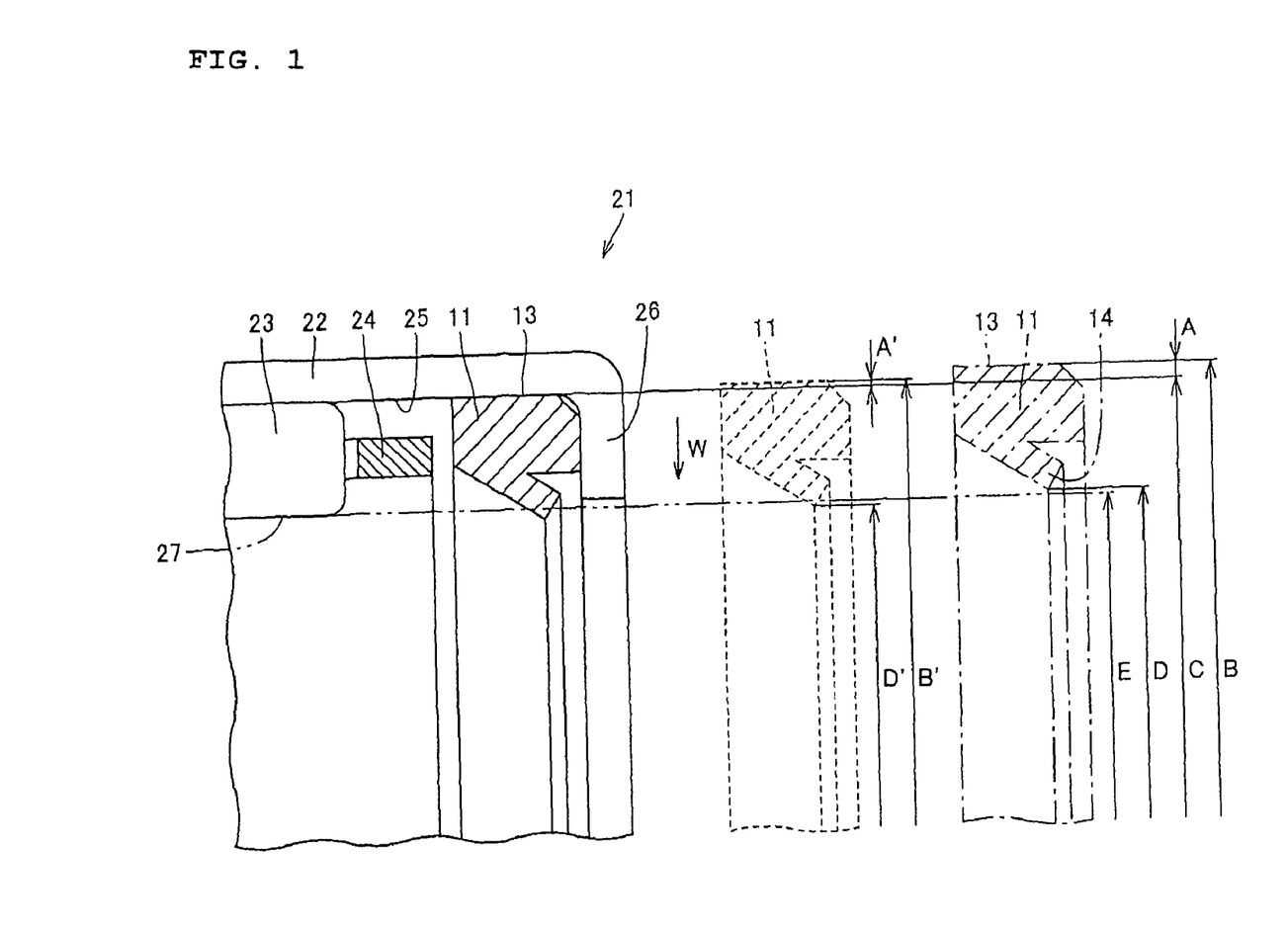
FIG. 1 is a sectional view showing a part of a shell-type roller bearing comprising a coreless seal for being assembled in a shell-type roller bearing according to one embodiment of the present invention.

Next, a description will be made of a state when the coreless seal 11 is assembled in the shell-type roller bearing provided in a throttle valve device. FIG. 1 is a sectional view showing a part of a shell-type roller bearing comprising the coreless seal 11 for being assembled in the shell-type roller bearing. In addition, in FIG. 1, an outline of the coreless seal 11 for being assembled in the shell-type roller bearing in a free state at low temperature is shown by a dotted line and an outline of the coreless seal 11 for being assembled in the shell-type roller bearing in a free state at room temperature is shown by one-dot chain line. Referring to FIG. 1, a shell-type roller bearing 21 supports a throttle shaft (not shown) as the rotation shaft positioned in the inner diameter side. The shell-type, roller bearing 21 comprises a shell-type outer ring 22 having a race surface on its inner diameter surface 25, a plurality of rollers 23, a retainer 24 retaining the plurality of rollers 23, and the coreless seal 11 for being assembled in the shell-type roller bearing. The shell-type outer ring 22 has a flange 26 extending toward inner side in a radial direction at its bended edge part.

The coreless seal 11 for being assembled in the shell-type roller bearing serving as a member constituting the shell-type roller bearing 21 is arranged between the throttle shaft and the shell-type outer ring 22 and assembled therein. The coreless seal 11 for being assembled in the shell-type roller bearing is positioned between the retainer 24 and the flange 26 in the axial direction.

Here, the assembled state at room temperature will be described first. The outer diameter B of the coreless seal 11 for being assembled in the shell-type roller bearing is a dimension provided by adding interference 2A to the inner diameter C of the inner surface 25 of the shell-type outer ring 22. Therefore, on the outer diameter side, the inner diameter surface 25 of the shell-type outer ring 22 nips an outer diameter surface 13 of the coreless seal 11 for being assembled in the shell-type roller bearing at appropriate pressure. In addition, on the inner diameter side, the inner diameter D of the lip part 14 is designed so as to be larger than the outer diameter E of the throttle shaft in the free state. However, the coreless seal 11 for being assembled in the shell-type roller bearing shrinks when it is assembled between the shell-type outer ring 22 and the throttle shaft. Therefore, since the inner diameter thereof after assembled between the throttle shaft and the shell-type outer ring 22 becomes smaller than the outer diameter E of the throttle shaft, the lip part 14 can nip the throttle shaft with appropriate pressure.

Next, the assembled state at low temperature will be described. On the outer diameter side, since the annular member 12 shrinks in a direction shown by a arrow W in FIG. 1, the outer diameter of the coreless seal 11 for being assembled in the shell-type roller bearing is reduced from B to B'. However, since the interference A for an amount of thermal shrinkage is provided in the outer diameter B, even after the shrinkage, the coreless seal 11 for being assembled in the shell-type roller bearing has a interference A' in the outer diameter B'. Therefore, even at low temperature, the inner diameter surface 25 of the shell-type outer ring 22 can nip the outer diameter of the coreless seal 11 for being assembled in the shell-type roller bearing with appropriate pressure without generating a gap between them. In addition, on the inner diameter side, the inner diameter of the lip part 14 is also reduced from D to D'. However, since it is a little smaller than the outer diameter E of the throttle shaft, it can nip the outer diameter surface 27 of the throttle shaft with appropriate pressure without increasing a biting amount to the throttle shaft.

As described above, the coreless seal for being assembled in the shell-type roller bearing can nip the outer diameter surface and the inner diameter surface and implement high sealing properties between the shell-type roller bearing and the throttle shaft even at low temperature.

Figure 3:
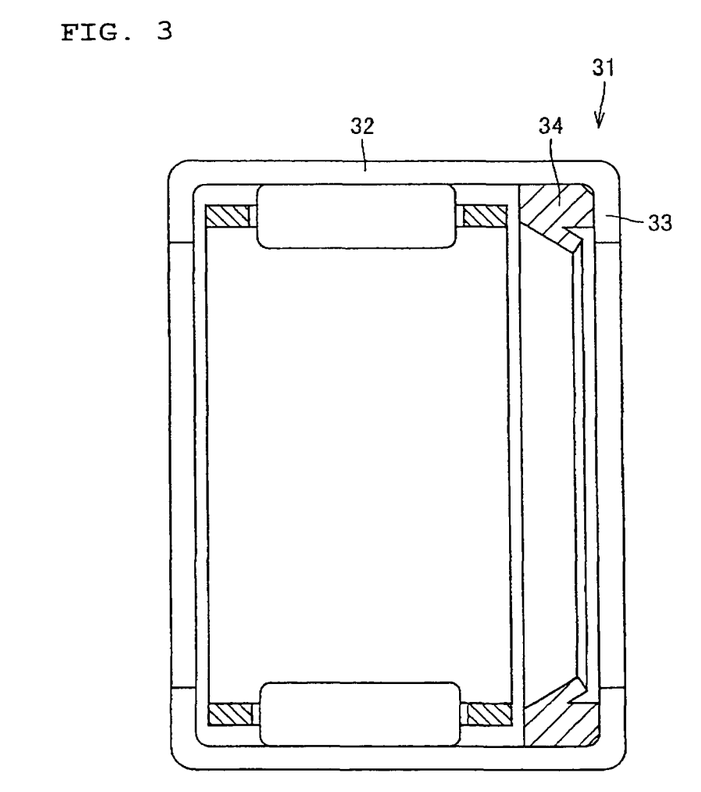
FIG. 3 is a sectional view showing a shell-type roller bearing comprising a coreless seal for being assembled in a shell-type roller bearing at one side of a flange.
Figure 4:
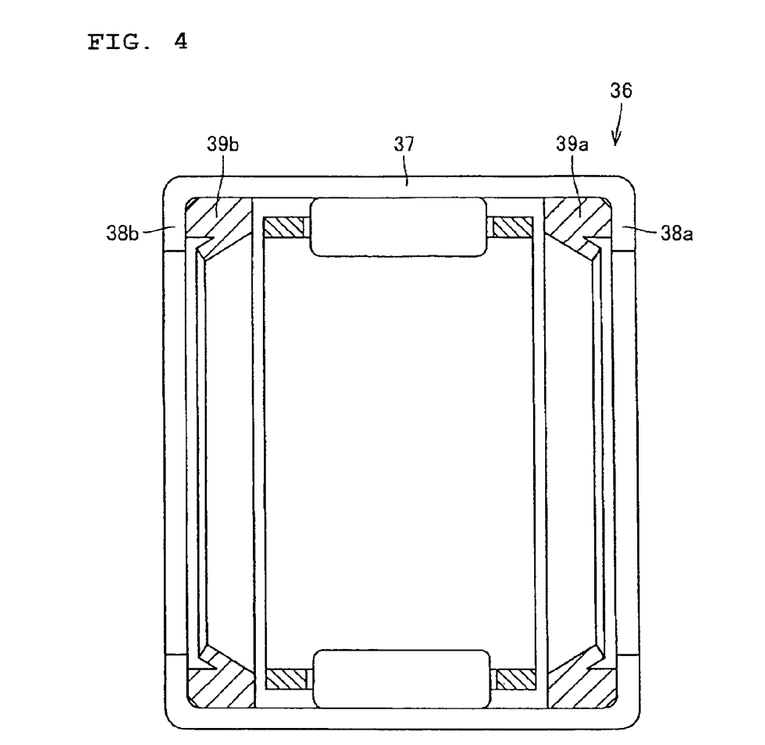
FIG. 4 is a sectional view showing a shell-type roller bearing comprising a coreless seal for being assembled in a shell-type roller bearing at both sides of the flange.

The coreless seal for being assembled in the shell-type roller bearing may be assembled on one side of the flange or may be assembled on both sides of the flange of the shell-type outer ring. FIG. 3 is a sectional view showing a shell-type roller bearing when a coreless seal for being assembled in a shell-type roller bearing is assembled on one side of the flange. Referring to FIG. 3, a shell-type roller bearing 31 incorporates a coreless seal 34 for being assembled in a shell-type roller bearing on one side of a flange 33 of a shell-type outer ring 32. Thus, leakage can be prevented on one side of the flange 33. In addition, FIG. 4 is a sectional view showing a shell-type roller bearing when a coreless seal for being assembled in a shell-type roller bearing is assembled on each side of the flange. Referring to FIG. 4, a shell-type roller bearing 36 incorporates coreless seals 39a and 39b for being assembled in a shell-type roller bearing on both sides of flanges 38a and 38b of a shell-type outer ring 37. Thus, leakage can be prevented on both sides of the flanges 38a and 38b.

In addition, although the throttle shaft and the shell-type outer ring of the shell-type roller bearing are used as the rotation shaft and the outer member, respectively in the above embodiment, another member may be used as the outer member.

Figure 5:
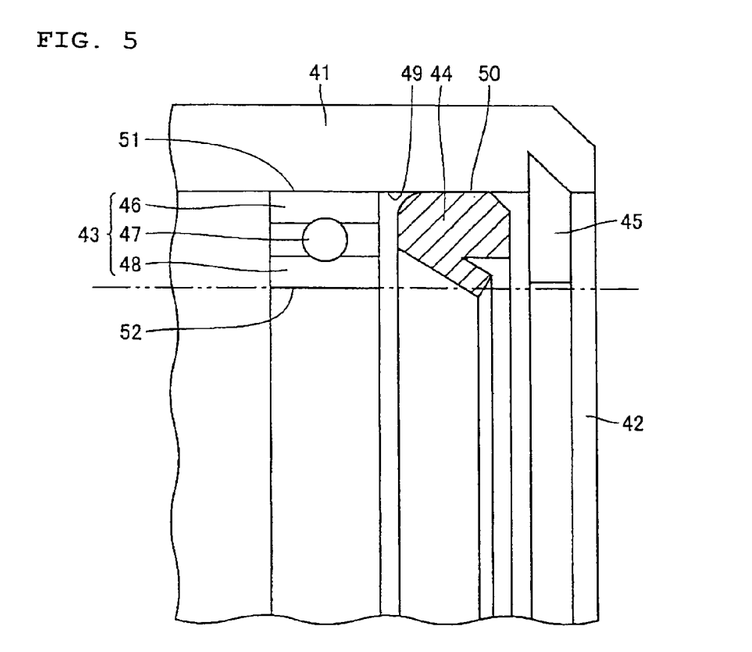
FIG. 5 is a sectional view when a coreless seal is arranged outside a ball bearing.

FIG. 5 is a sectional view showing a state when a coreless seal is arranged between a housing serving as an outer member and a rotation shaft. Referring to FIG. 5, a ball bearing 43 is arranged between an inner diameter hole 42 provided in the housing 41 and the rotation shaft (not shown) and supports the rotation shaft positioned on the inner diameter side. The ball bearing 43 comprises a ball 47 serving as a rolling member, an inner ring 48 and an outer ring 46. An outer diameter surface 51 of the outer ring 46 is in contact with an inner diameter surface 49 of the inner diameter hole 42, and an inner diameter surface 52 of the inner ring 48 is in contact with an outer diameter surface of the rotation shaft. In addition, a cap 45 is provided on an opening end side of the inner diameter hole 42 outside the ball bearing 43 in the axial direction in order to prevent a foreign material from entering from the outside.

Here, a coreless seal 44 is arranged between the rotation shaft and the housing 41. Its position in the axial direction is between the ball bearing 43 and the cap 45. Here, since the coreless seal 44 is a dimension obtained by adding interference for an amount of thermal shrinkage, the inner diameter surface 49 of the inner diameter hole 42 can nip an outer diameter surface 50 of the coreless seal 44 with appropriate pressure even at low temperature. In addition, a lip part of the coreless seal 44 does not bite the outer diameter surface of the rotation shaft. Thus, leakage can be prevented at the spaced part between the rotation shaft and the housing.

In addition, although the shell-type roller bearing comprises the retainer in the above embodiment, the shell-type roller bearing may be a full type roller bearing having no retainer.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

Since the coreless seal and the rolling bearing according to the present invention has high sealing properties even at low temperature, it can be effectively used in a shell-type roller bearing provided in a throttle valve device and the like used in low-temperature environment and requiring high air-leakage preventing performance.

The invention claimed is:

1. A coreless seal arranged between a rotation shaft and a shell-type outer ring, the coreless seal having an inner diameter surface opposed to an outer diameter surface of said rotation shaft with a space for preventing leakage of fluid, wherein
the shell-type outer ring has a flange bent inwardly, and further wherein an outer diameter and an inner diameter of said coreless seal are dimensions obtained by adding interference for an amount of shrinkage; and still further wherein
the coreless seal has a lip part which projects inwardly and toward the flange of the shell-type outer ring;
a surface of the outer diameter being flat when viewed in cross section; and
an end surface of the coreless seal which is in contact with the flange of the shell-type outer ring in an axial direction is flat;
wherein when it is assumed that said dimension obtained by adding interference for an amount of thermal shrinkage in a radial direction is A, and an outer diameter dimension of said coreless seal in a free state at room temperature is B, the following relation is satisfied, $0.005B \leq A \leq 0.030B$; and when it is assumed that an outer diameter dimension of said coreless seal in a free state at room temperature is B, and an inner diameter dimension of said outer ring is C, the following relation is satisfied, $0.950B \leq C \leq 0.985B$, and when it is assumed that said dimension obtained by adding interference for an amount of thermal shrinkage in a radial direction is A, an inner diameter dimension of said coreless seal in a free state at room temperature is D, and an outer diameter dimension of said rotation shaft is E, the following relation is satisfied, $E < D < E + 2A$.

2. The coreless seal according to claim 1, wherein said coreless seal is a careless seal for being assembled in a shell-type roller bearing.

3. A rolling bearing having the coreless seal according to claim 1.

4. The rolling bearing according to claim 3, wherein said rolling bearing comprises a roller bearing having a shell-type outer ring.

* * * * *